(12) United States Patent
Chae (10) Patent No.: US 9,444,388 B2
(45) Date of Patent: Sep. 13, 2016

(54) MEDIUM VOLTAGE INVERTER SYSTEM

(71) Applicant: LSIS CO., LTD., Anyang-si, Gyeonggi-do (KR)

(72) Inventor: Beom Seok Chae, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 129 days.

(21) Appl. No.: 14/188,445

(22) Filed: Feb. 24, 2014

(65) Prior Publication Data

US 2014/0292246 A1 Oct. 2, 2014

(30) Foreign Application Priority Data

Mar. 29, 2013 (KR) .................. 10-2013-0034214

(51) Int. Cl.
| | |
|---|---|
| *H02H 7/08* | (2006.01) |
| *H02P 27/06* | (2006.01) |
| *H02H 9/00* | (2006.01) |
| *H02M 7/49* | (2007.01) |
| *H02M 1/32* | (2007.01) |
| *H02M 5/458* | (2006.01) |
| *H02M 1/00* | (2006.01) |
| *H02P 27/14* | (2006.01) |

(52) U.S. Cl.
CPC ............ *H02P 27/06* (2013.01); *H02H 7/0838* (2013.01); *H02H 9/002* (2013.01); *H02M 7/49* (2013.01); *H02M 1/32* (2013.01); *H02M 5/458* (2013.01); *H02M 2001/0006* (2013.01); *H02P 27/14* (2013.01)

(58) Field of Classification Search
USPC .............. 318/504, 563, 400.21, 400.22, 782, 318/783, 400.3, 400.17, 400.26; 363/37
See application file for complete search history.

(56) References Cited

U.S. PATENT DOCUMENTS

| | | | | |
|---|---|---|---|---|
| 4,642,475 | A | * | 2/1987 | Fischer ................... H02J 9/062 307/46 |
| 6,653,806 | B1 | * | 11/2003 | Ono ........................ B60L 7/003 318/375 |
| 7,019,483 | B2 | * | 3/2006 | Markert ................... H02P 5/00 307/67 |
| 2009/0073622 | A1 | | 3/2009 | Hammond |
| 2010/0301975 | A1 | | 12/2010 | Hammond |
| 2012/0113693 | A1 | * | 5/2012 | Sekimoto .............. H02M 5/458 363/37 |

FOREIGN PATENT DOCUMENTS

| | | |
|---|---|---|
| CN | 101855695 | 10/2010 |
| CN | 102195460 | 9/2011 |
| CN | 102414975 | 4/2012 |

(Continued)

OTHER PUBLICATIONS

Japan Patent Office Application Serial No. 2014-049862, Office Action dated Feb. 17, 2015, 3 pages.

(Continued)

Primary Examiner — Jorge L Carrasquillo
(74) *Attorney, Agent, or Firm* — Lee, Hong, Degerman, Kang & Walmey; Jonathan Kang; Richard Salfelder (57) ABSTRACT

A medium voltage inverter system is provided. The inverter system includes a controller configured to short-circuit the output terminal of the inverter unit when failure occurs, a supply unit configured to supply an electric power to the controller, and an auxiliary rectifying unit configured to rectify the AC voltage provided through the input terminal and to supply the rectified AC voltage to the supply unit.

6 Claims, 7 Drawing Sheets

(56) References Cited

FOREIGN PATENT DOCUMENTS

| | | | |
|---|---|---|---|
| EP | 2456060 | | 5/2012 |
| JP | 63-58899 | | 4/1988 |
| JP | 63058899 U | * | 4/1988 |
| JP | 10-014132 | | 1/1998 |
| JP | 2009-038848 | | 2/2009 |
| JP | 2009038848 A | * | 2/2009 |
| JP | 2010-539877 | | 12/2010 |
| JP | 2011-193589 | | 9/2011 |

OTHER PUBLICATIONS

European Patent Office Application Serial No. 14158250.2, Search Report dated Sep. 17, 2015, 6 pages.

The State Intellectual Property Office of the People's Republic of China Application Serial No. 201410124555.7, Office Action dated Mar. 16, 2016, 6 pages.

* cited by examiner

MEDIUM VOLTAGE INVERTER SYSTEM

CROSS-REFERENCE TO RELATED APPLICATION

Pursuant to 35 U.S.C.§119 (a), this application claims the benefit of earlier filing date and right of priority to Korean Patent Application No. 10-2013-0034214, filed on Mar. 29, 2013, the contents of which are hereby incorporated by reference in their entirety.

BACKGROUND OF THE DISCLOSURE

1. Field of Endeavor

The teachings in accordance with exemplary embodiments of this disclosure generally relate to a medium voltage inverter system.

2. Background

Recently, interest in multilevel inverters has increased as a topology for a medium voltage inverter system. A medium voltage inverter has been developed concomitant with requirements for development of high voltage power devices for promoting effective and flexible operation of power systems such as FACTSs (Flexible Alternating Current Transmission Systems). The multilevel medium inverters may include diode clamp inverters, cascades H-bridge inverters and flying capacitor inverters. Among the multilevel medium inverters, the cascaded H-bridge inverter is configured such that low voltage H-bridges are connected in series to form unit cells having independent Direct Current link units, where a sum of voltages of each cell and a total output voltage are same in size, and an output H-bridge inverter to be widely used.

SUMMARY OF THE DISCLOSURE

The present disclosure is to provide a medium voltage inverter system configured with unit power cells guaranteed for effective and stable operation.

In one general aspect of the present disclosure, there may be a medium voltage inverter system, the system comprising: a first rectifying unit configured to rectify an AC voltage provided through an input terminal to a DC voltage; a smoothing unit configured to smooth the DC voltage rectified by the first rectifying unit, the smoothing unit including a capacitor; an inverter unit configured to convert the DC voltage smoothed by the smoothing unit to a predetermined AC voltage and to output the AC voltage to a motor through an output terminal; a controller configured to short-circuit the output terminal of the inverter unit when failure occurs; a supply unit configured to supply an electric power to the controller; and an auxiliary rectifying unit configured to rectify the AC voltage provided through the input terminal and to supply the rectified AC voltage to the supply unit.

In some exemplary of the present invention, the system may further comprise an initial charging unit configured to charge the capacitor of the smoothing unit during an initial driving.

In some exemplary of the present invention, the auxiliary rectifying unit may comprise a second rectifying unit configured to rectify the AC voltage provided through the input terminal and to supply the rectified AC voltage to the supply unit; and a providing unit configured to provide the voltage of the smoothing unit to the supply unit.

In some exemplary of the present invention, the auxiliary rectifying unit may further comprise a resistor arranged between the second rectifying unit and the supply unit and configured to limit an inrush current to the supply unit.

In some exemplary of the present invention, the providing unit may prevent the voltage provided to the supply unit from the second rectifying unit from being provided to the smoothing unit.

In some exemplary of the present invention, the providing unit may include at least two diodes configured to connect the smoothing unit to the supply unit, and the at least two diodes are arranged to a backward direction.

In some exemplary of the present invention, the supply unit may be further configured to receive a voltage from the second rectifying unit during the initial driving.

In some exemplary of the present invention, the supply unit may be further configured to receive a voltage from the smoothing unit during a normal operation.

In some exemplary of the present invention, the supply unit may be further configured to receive a voltage from the second rectifying unit during an abnormal operation.

In some exemplary of the present invention, the controller may be further configured to receive the electric power from the supply unit to short-circuit the output terminal of the inverter unit.

DETAILED DESCRIPTION

The following description is not intended to limit the disclosure to the form disclosed herein. Consequently, variations and modifications commensurate with the following teachings, and skill and knowledge of the relevant art are within the scope of the present disclosure. The embodiments described herein are further intended to explain modes known of practicing the disclosure and to enable others skilled in the art to utilize the disclosure in such, or other embodiments and with various modifications required by the particular application(s) or use(s) of the present disclosure.

The present disclosure provides a unit power cell having a bypassing function, even if there is a failure in a serially connected H-bridge type medium voltage inverter such as a fuse open, or a SCR (Silicon Controlled Rectifier)'s Burnt-out.

Hereinafter, a medium voltage inverter system according to the present disclosure will be described in detail with reference to the accompanying drawings.

Figure 1:
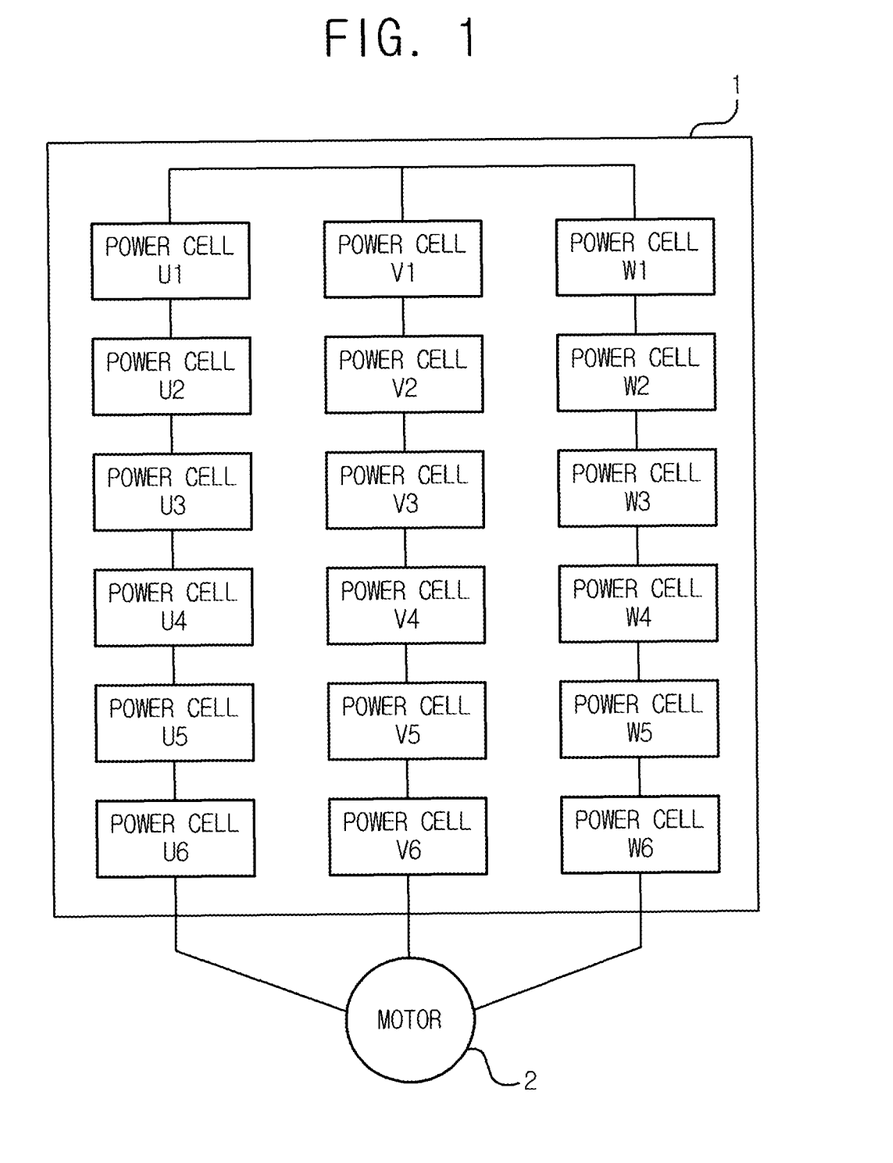
FIG. 1 is a structural view illustrating a medium voltage inverter system according to an exemplary embodiment of the present disclosure.

FIG. 1 is a structural view illustrating a medium voltage inverter system according to an exemplary embodiment of the present disclosure.

Referring to FIG. 1, the medium voltage inverter system according to an exemplary embodiment of the present disclosure is configured by being serially connected with a plurality of unit power cells (U1~U6, V1~V6, W1~W6) for each output phase. In the present disclosure, six unit power cells are serially connected in order to provide an output voltage of a single phase to a motor (2). However, the number of connected unit power cells is simply exemplary, and therefore, the present disclosure is not limited thereto.

Hence, the unit power cells (U1~U6) can provide an output voltage of first phase to the motor (20), the unit power cells (V1~V6) can provide an output voltage of second phase to the motor (2), and the unit power cells (W1~W6) can provide an output voltage of third phase to the motor (2). The motor (2) may be driven by a 3-phase voltage provided by an inverter (1).

Figure 2:
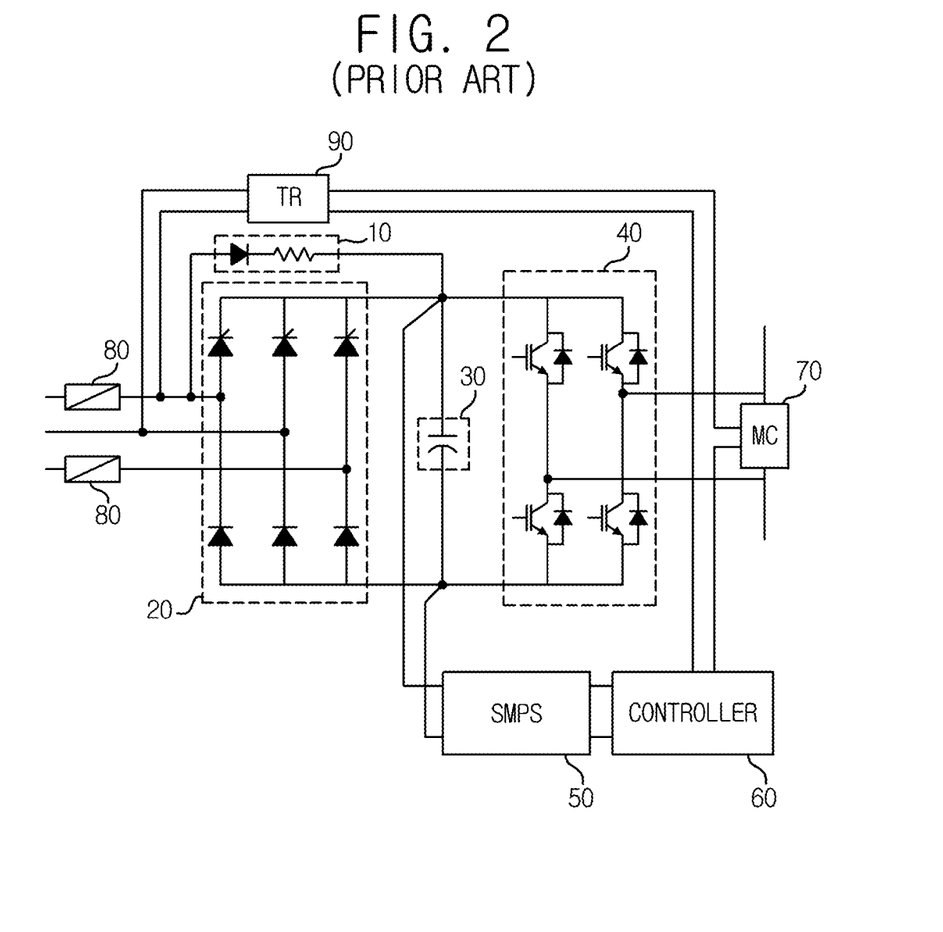
FIG. 2 is a detailed structural view illustrating a unit power cell according to prior art.

FIG. 2 is a detailed structural view illustrating a unit power cell according to prior art.

Referring to FIG. 2, a unit power cell means an inverter of a single phase, and may include a rectifying unit (20), a smoothing unit (30) and an inverter unit (40). The unit power cell may further include an initial charging unit (10), an SMPS (Switching Mode Power Supply, 50) and a controller (60).

The SMPS (50) may supply an electric power to the controller (60) using a switching circuit. The controller (60) can control an operation of a unit power cell in response to state of an MC (Magnetic Contactor, 70). To be more specific, when there is generated a failure at a unit power cell, the controller (60) closes contact points of the MC (70), whereby an output of the failed unit power cell is short-circuited.

As discussed above, a serially-connected H-bridge type medium voltage inverter system is configured with serially-connected single-phased inverters, such that when there is generated a failure on any arbitrary unit power cell in the serially-connected unit power cells, a bypass function configured to shirt-circuit an output of a relevant unit power cell is implemented to enable a continuous operation.

However, in the unit power cell as in FIG. 2, when a failure such as opening of a fuse (80) is generated at an input terminal of the inverter, a voltage of a capacitor at the smoothing unit (30) is discharged to render the SMPS (50) to be inoperative. Then, the controller (60) that has failed to receive an electric power from the SWMPS (50) cannot open or close the contact points of MC (70) to disable a bypassing function. Another problem is that, because an input side of a transformer (TR, 90) is wired to a rear surface of the fuse (80), an electric power cannot be supplied to the MC (70) when the fuse is opened.

The present disclosure therefore proposes an inverter capable of implementing a bypass function even if there is generated a failure at an input terminal That is, a cell bypass is enabled in the serially-connected H-bridge type medium voltage inverter system according to the present disclosure, even if there is generated a failure such as an opened fuse at an input terminal of inverter.

Figure 3:
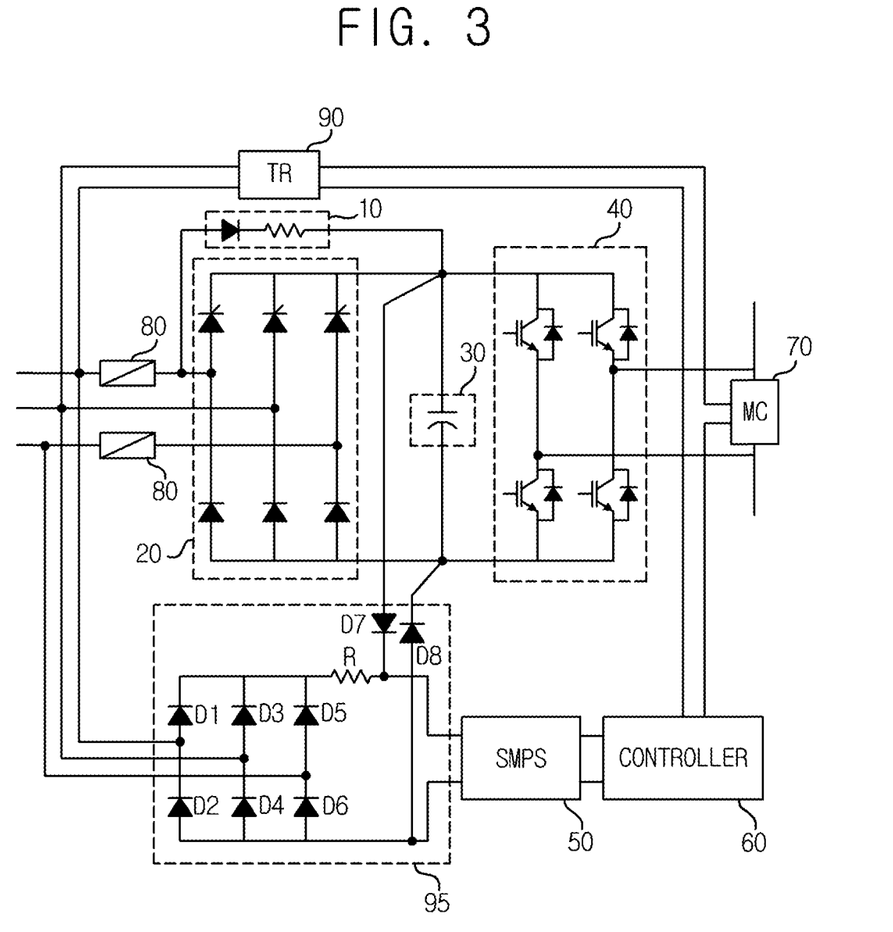
FIG. 3 is a structural view illustrating a unit power cell of a medium voltage inverter according to an exemplary embodiment of the present disclosure.
Figure 4A:
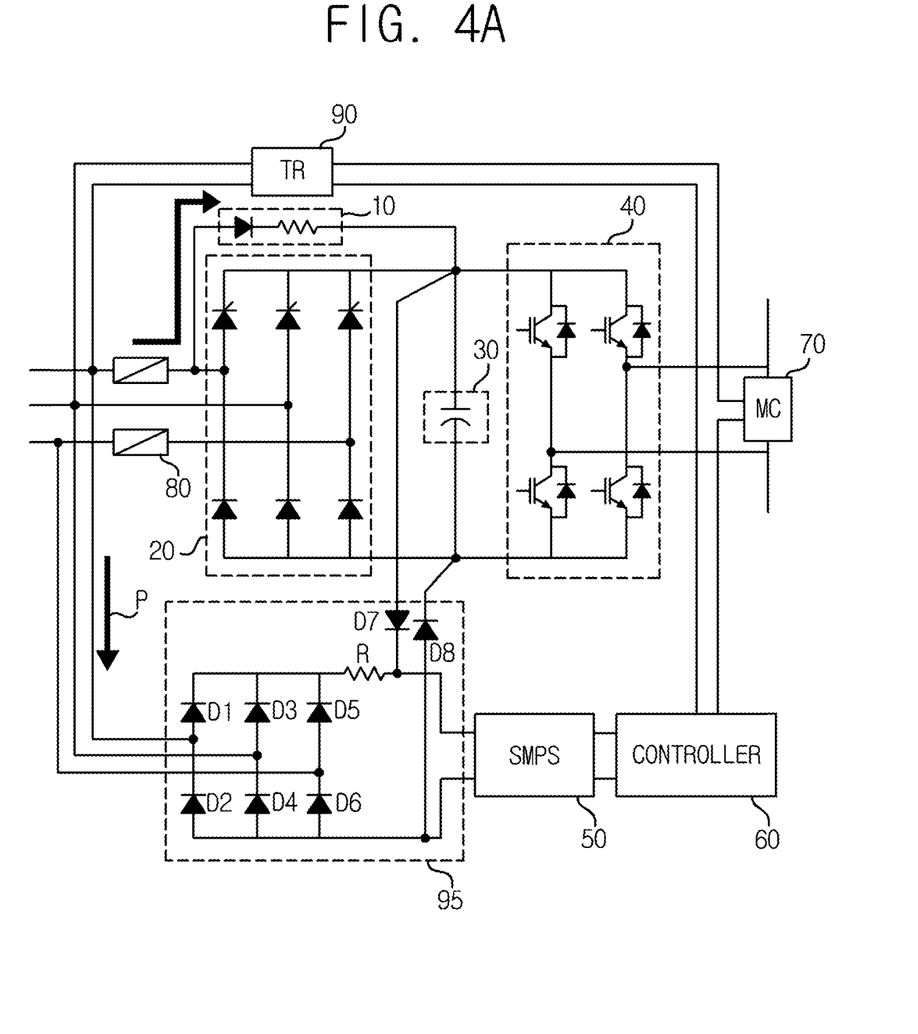
FIGS. 4A to 4C are schematic views illustrating operation of the unit power cell of FIG. 3.
Figure 4B:
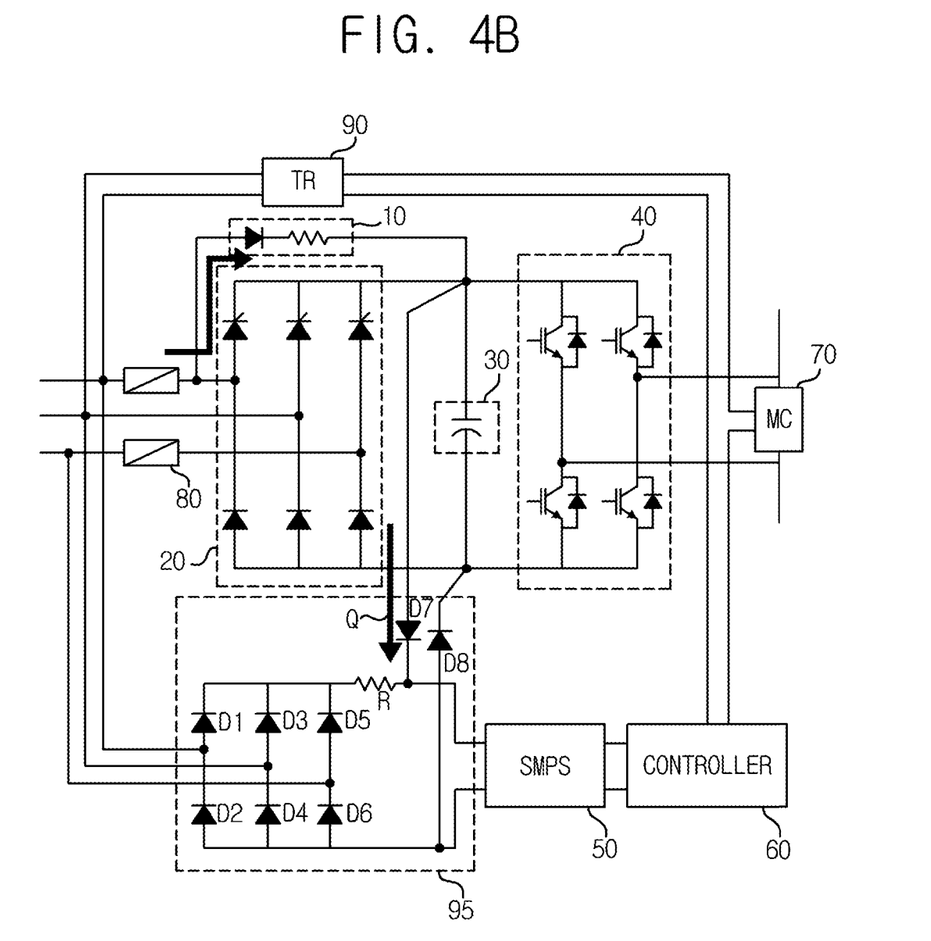

FIG. 3 is a structural view illustrating a unit power cell of a medium voltage inverter according to an exemplary embodiment of the present disclosure, and FIGS. 4A and 4B are schematic views illustrating operation of the unit power cell of FIG. 3.

The unit power cells of the present disclosure constitute the medium voltage inverter system as in FIG. 1. As illustrated in drawings, the unit power cell of medium voltage inverter according to the present disclosure may include a rectifying unit (20), a smoothing unit (30), an inverter unit (40), and an auxiliary rectifying unit (95). The unit power cell may further include an initial charging unit (10), an SMPS (50) and a controller (60).

The SMPS (50) may supply an electric power to the controller (60) using a switching circuit, and the controller (60) can control short-circuit at contact points of the MC (70), an output terminal of the inverter unit (40), using the electric power supplied by the SMPS (50).

The rectifying unit (20) serves to convert an inputted AC voltage to a DC voltage. To this end, three pairs of diodes, a total of six diodes, are serially connected and respectively receive 3-phased input voltages at a commonly-connected node. The smoothing unit (30) includes a capacitor for smoothing a DC type voltage supplied by the rectifying unit (20).

The inverter unit (40) includes a plurality of switch units to convert the voltage smoothed by the smoothing unit (30) to an AC voltage having a predetermined value using a switching operation. Although the present disclosure has exemplified an inverter unit with four switch units, the present disclosure is not limited thereto, and the inverter unit may be arranged with various types of switch units.

The controller (60) can control an operation of a unit power cell in response to state of an MC (70). To be more specific, when there is generated a failure at a unit power cell, the controller (60) closes contact points of the MC (70), whereby an output of the failed unit power cell is short-circuited.

The auxiliary rectifying unit (95) may include six rectifying diodes (D1~D6), two blocking diodes D7, D8 and an inrush current limiting resistor (R). The six rectifying diodes (D1~D6), i.e., three pairs of rectifying diodes, are serially connected as in the rectifying unit (20), and respectively receive 3-phased input voltages at a commonly-connected node. The two blocking diodes D7, D8 may connect two nodes of the smoothing unit (30) to the auxiliary rectifying unit (95). The inrush current limiting resistor (R) may be interposed between the rectifying diodes (D1~D6) and the SMPS (50). The six rectifying diodes (D1~D6) of the auxiliary rectifying unit (95) rectify a 3-phase AC voltage to a DC voltage and supply the rectified DC voltage to the SMPS (50). The SMPS (50) supplies an electric power to the controller (60) using the switching circuit.

The two blocking diodes D7, D8 may provide a voltage of capacitor at a DC terminal of the smoothing unit (30) to the SMPS (50), and prevents an input voltage inputted to the SMPS (50) from the six rectifying diodes (D1~D6) from flowing to a capacitor at a DC terminal of the smoothing unit (30). That is, the two blocking diodes D7, D8 are interposed between the smoothing unit (30) and an input terminal of the SMPS (50), where the D7 and D8 may be arranged in reverse direction. The inrush current limiting resistor (R) is arranged between the six rectifying diodes (D1~D6) and the SMPS (50) to prevent the SMPS (50) from being damaged by an excessive inrush current when a voltage is inputted to the SMPS (50).

FIGS. 4A and 4B are schematic views illustrating operation of the auxiliary rectifying unit (95) at each state, and particularly illustrates a voltage supply flow to the unit power cell.

Referring to FIG. 4A, when a power voltage is supplied, an inverter input voltage charges a capacitor at a DC terminal of the smoothing unit (30) via the initial charging unit (10), and the SMPS (50) receives a voltage through the auxiliary rectifying unit (95) (See 'P' of FIG. 4A).

Referring to FIG. 4B, a capacitor at a DC terminal of the smoothing unit (30) receives a voltage via the rectifying unit (20) as a predetermined initial charging time elapses, and the SMPS (50) in turn receives a voltage from a capacitor at a DC terminal of the smoothing unit (30) (See 'Q' of FIG. 4B).

Figure 4C:
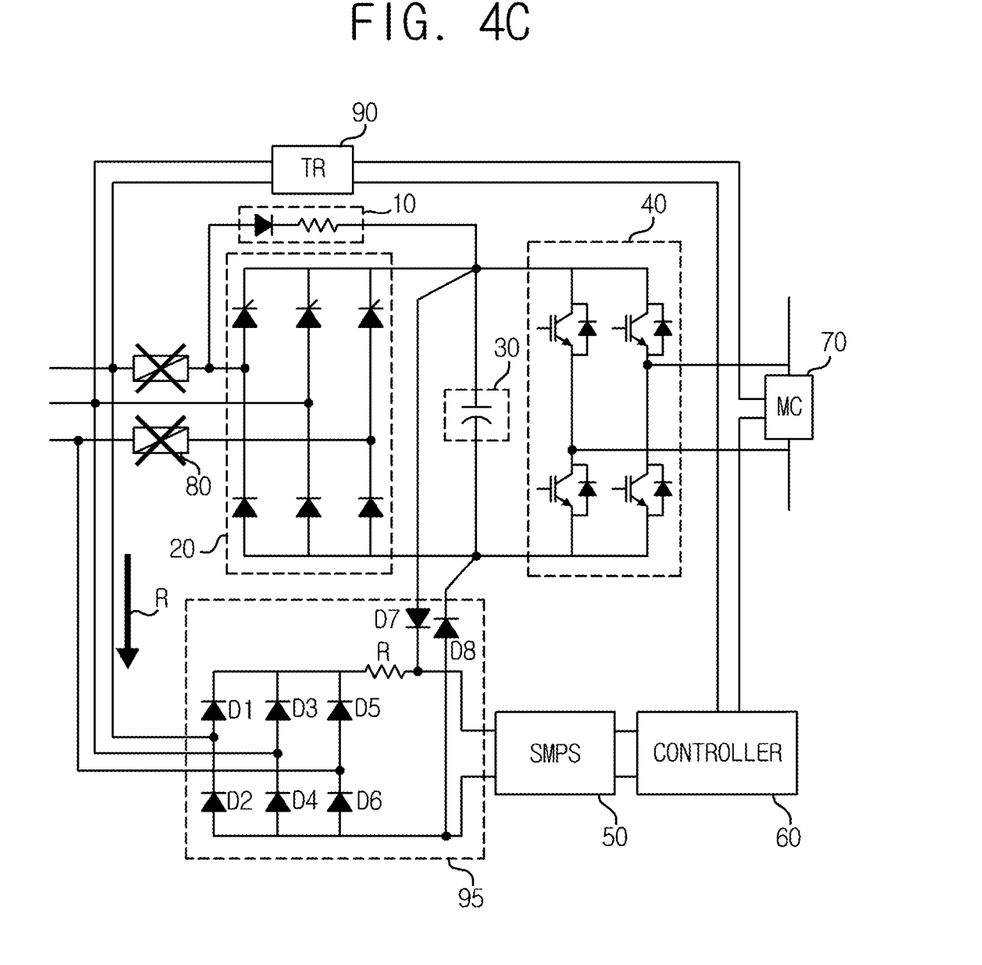

The capacitor at the DC terminal of the smoothing unit (30) slowly discharges the voltage when a failure is generated on the unit power cell due to burnt-out at the input terminal, and the SMPS (50) receives a voltage in response to potential difference through the auxiliary rectifying unit (95) (See 'R' of FIG. 4C).

As discussed above, the controller (60) can close the contact points of the MC (70) using the SMPS (50) that continuously receives a voltage, whereby an output of failed unit power cell comes to be in a short-circuited state. Hence, the SMPS (50) can operate normally, even if there is generated a failure on the input terminal of the unit power cell, and the controller (60) can receive an electric power to perform the bypassing operation.

Figure 5:
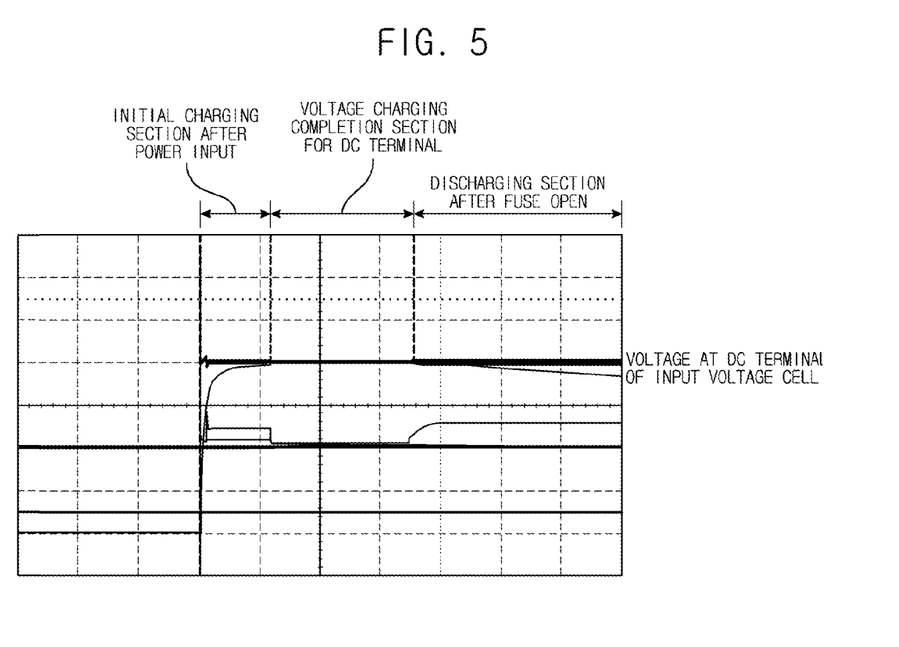
FIG. 5 is a schematic view illustrating an input voltage waveform of the SMPS before and after burnt-out at an input terminal of a unit power cell, and a voltage waveform applied to a DC terminal of a capacitor at a smoothing unit.

FIG. 5 is a schematic view illustrating an input voltage waveform of the SMPS (50) before and after burnt-out at an input terminal of a unit power cell, and a voltage waveform applied to a DC terminal of a capacitor at a smoothing unit (30).

Referring to FIG. 5, it can be confirmed that an input voltage of the SMPS (50) is continuously supplied through the auxiliary rectifying unit (95), although the voltage is discharged that is applied to the capacitor at the DC terminal of the smoothing unit (30) at the inverter unit power cell after the fuse (80) is opened.

As apparent from the foregoing, the medium voltage inverter system according to exemplary embodiments of the present disclosure can be advantageously applied to a serially connected H-bridge type medium voltage inverter to perform a cell bypass function, even if an input power is not properly supplied to a rectifying circuit inside a unit power cell due to burnt-out at an input terminal. Thus, the medium voltage inverter system according to exemplary embodiments of the present disclosure can expect an improvement in operational stability.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A medium voltage inverter system, the system comprising:
   a first rectifying unit configured to rectify an Alternating Current (AC) voltage provided through an input terminal to a DC voltage;
   a smoothing unit configured to smooth the DC voltage rectified by the first rectifying unit, the smoothing unit including a capacitor;
   an inverter unit configured to convert the DC voltage smoothed by the smoothing unit to a predetermined AC voltage and to output the AC voltage to a motor through an output terminal;
   a controller configured to short-circuit the output terminal of the inverter unit when failure occurs;
   a supply unit configured to supply electrical power to the controller;
   an auxiliary rectifying unit configured to rectify the AC voltage provided through the input terminal and to supply the rectified AC voltage to the supply unit; and
   an initial charging unit configured to charge the capacitor of the smoothing unit during an initial driving,
   wherein the supply unit is further configured to:
   receive a voltage from the auxiliary rectifying unit during the initial driving;
   receive a voltage from the smoothing unit during a normal operation as a predetermined initial charging time elapses; and
   receive a voltage from the auxiliary rectifying unit in response to potential difference while the smoothing unit discharges during an abnormal operation.

2. The system of claim 1, wherein the auxiliary rectifying unit comprises:
   a second rectifying unit configured to rectify the AC voltage provided through the input terminal and to supply the rectified AC voltage to the supply unit; and
   a providing unit configured to provide the voltage of the smoothing unit to the supply unit.

3. The system of claim 2, wherein the auxiliary rectifying unit further comprises a resistor arranged between the second rectifying unit and the supply unit and configured to limit an inrush current to the supply unit.

4. The system of claim 2, wherein the providing unit prevents the voltage provided to the supply unit from the second rectifying unit from being provided to the smoothing unit.

5. The system of claim 4, wherein the providing unit includes at least two diodes configured to connect the smoothing unit to the supply unit, and the at least two diodes are arranged to a backward direction.

6. The system of claim 1, wherein the controller is further configured to receive the electric power from the supply unit to short-circuit the output terminal of the inverter unit.

* * * * *